(12) United States Patent
Zittel

(10) Patent No.: US 6,187,360 B1
(45) Date of Patent: Feb. 13, 2001

(54) METHOD OF OPERATION OF A PRESSURIZED ROTARY BLANCHER

(76) Inventor: David R. Zittel, 155 Oak Grove Dr., Columbus, WI (US) 53925

(*) Notice: Under 35 U.S.C. 154(b), the term of this patent shall be extended for 0 days.

(21) Appl. No.: 09/505,029

(22) Filed: Feb. 16, 2000

Related U.S. Application Data

(62) Division of application No. 09/222,969, filed on Dec. 30, 1998, now Pat. No. 6,105,485.

(51) Int. Cl.⁷ ........................................... A23L 1/00
(52) U.S. Cl. ........................ 426/510; 426/511; 426/523
(58) Field of Search ............................ 426/510, 511, 426/520, 523; 99/348, 355, 404, 409, 470, 517

(56) References Cited

U.S. PATENT DOCUMENTS

| | | | |
|---|---|---|---|
| Re. 26,257 | * | 8/1967 | Altman .................................. 426/510 |
| 3,528,815 | * | 9/1970 | Trotter ................................... 426/510 |

* cited by examiner

Primary Examiner—George C. Yeung
(74) Attorney, Agent, or Firm—Nilles & Nilles SC

(57) ABSTRACT

A rotary blancher that is sealed such that it can be positively pressurized during operation to a pressure greater than the ambient pressure outside the blancher to increase food product heating speed and efficiency. The blancher has a sealed housing, a sealed food product inlet, and a sealed food product outlet all for enabling an atmosphere inside the blancher to be positively pressurized. A heat transfer medium, such as a heated gas, a heated vapor, a heated liquid, or a combination thereof is introduced into the blancher to heat the food product inside the blancher. In one preferred embodiment, steam and hot water comprise the heat transfer medium. During operation, food products are continuously or substantially continuously introduced into the blancher through the food product inlet, continuously or substantially continuously processed by the blancher, and thereafter continuously or substantially continuously discharged from the blancher through the food product outlet. As a result, a greater amount of food products can be more quickly heated to a desired temperature using a blancher of this invention as compared to a blancher that is not sealed and pressurized.

15 Claims, 13 Drawing Sheets

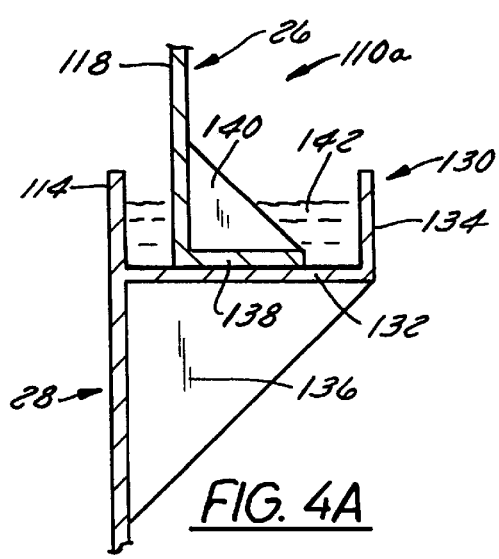
_FIG. 4A_
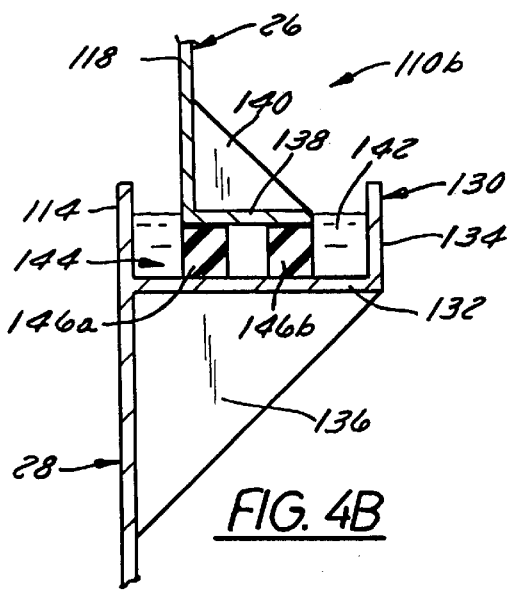
_FIG. 4B_
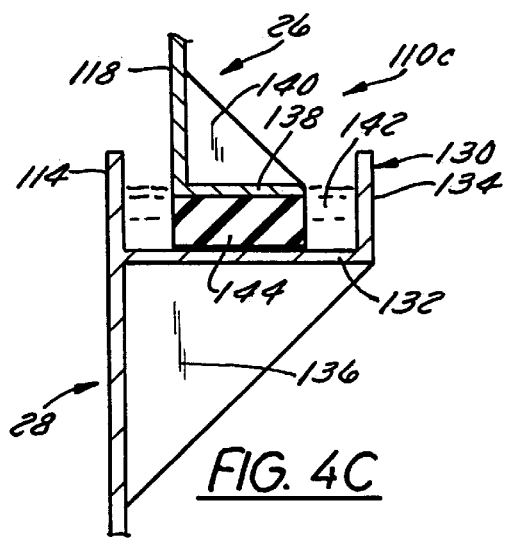
_FIG. 4C_
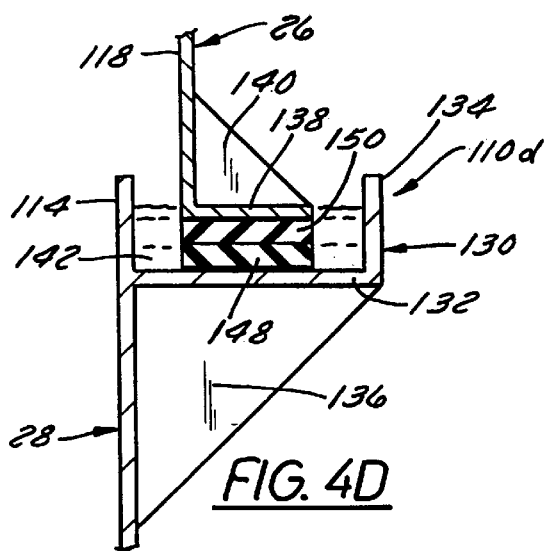
_FIG. 4D_
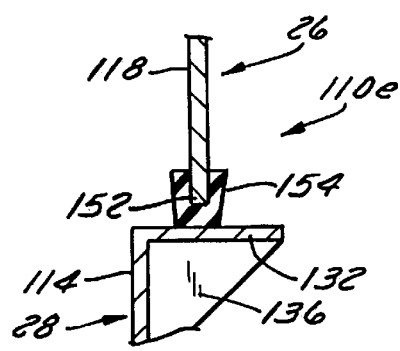
_FIG. 4E_
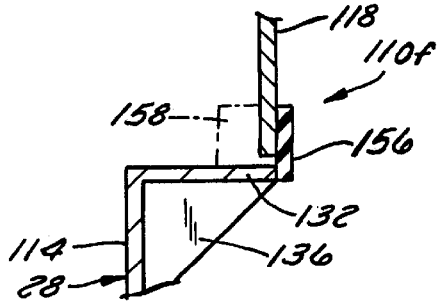
_FIG. 4F_

METHOD OF OPERATION OF A PRESSURIZED ROTARY BLANCHER

This application is a division of application Ser. No. 09/222,969, filed Dec. 30, 1998, now U.S. Pat. No. 6,105,485.

FIELD OF THE INVENTION

The present invention relates to rotary blanchers and more particularly to a method of operation of a positively pressurized rotary blancher that more efficiently and more quickly heats food product.

BACKGROUND OF THE INVENTION

A wide variety of food products, such as pasta, beans, corn, peas, juices, sauces, and other vegetables and fruit, are processed by blanching or cooking prior to being frozen, packaged and shipped. Generally, there are two types of industrial blanchers: the steam belt blancher, as exemplified by U.S. Pat. No. 4,942,810, issued Jul. 24, 1990 to Zittel, et al., and the rotary blancher, examples of which are disclosed in U.S. Pat. No. 5,146,841, issued Sep. 15, 1992 to Zittel, and U.S. Pat. No. 5,632,195, issued May 27, 1997 to Zittel.

The steam belt blancher uses a conveyor belt to move food products through a chamber to subject the food product to a continuous, controlled temperature treatment in steam. Although the steam belt blancher has been heretofore commercially successful because it offers the advantage of using only steam, which is known to be a more efficient heat transfer medium than hot water, it suffers from having a great many moving parts, and can be expensive and relatively slow in operation. Moreover, it is not sealed at its inlet and outlet which means that the pressure within cannot be greater than the pressure outside.

Pressure cookers have also found use in commercial food processing applications because they are sealed and operate at a pressure inside greater than the pressure outside, i.e. ambient pressure. By operating at a pressure greater than ambient, food product inside a pressure cooker is heated more quickly and efficiently. Unfortunately, pressure cookers process food in batches and thereby cannot operate continuously because they must be periodically opened to remove processed food product and to reload new food product that is to be processed. When opened, nearly all of the heated, pressurized atmosphere within the pressure cooker escapes wasting a great deal of energy. Moreover, valuable cooking time is also lost because the pressure cooker cannot operate until it is loaded and because it takes time after loading for the atmosphere within the pressure cooker to once again reach the desired temperature and pressure. In commercial food processing, this start-stop cycling dramatically reduces the efficiency and desirability of pressure cookers. Hence, pressure cookers are only used in limited commercial applications, mainly because blanchers can operate nearly continuously and can process much larger loads of food product during operation than pressure cookers.

Prior art rotary blanchers typically use hot water, or a combination of hot water injected with steam as the heat transfer medium. However, because rotary blanchers churn and tumble the food product through a turbulent hot water bath, they are capable of processing a larger volume of food product at greater speed than a comparably sized steam belt blancher or pressure cooker.

In a rotary blancher, food product is introduced into an inlet end of an elongate cylindrically shaped drum, which is rotatably mounted in a generally cylindrical, open-top tank. The tank has a lid for enclosing the drum that can be opened for maintenance and cleaning. The drum has a helical auger running lengthwise through the drum that rotates during operation for transporting the food product from the drum inlet opening on one end to an outlet or discharge opening at the other end. The drum cylinder typically has sidewalls that are perforated to contain the food product in the drum while allowing a liquid heat transfer medium to come in contact with the food product as it is transported by the auger through the drum. As the food product moves from the inlet end of the tank to the outlet end, the time it remains in the tank, i.e., the residency time, is controlled to ensure that the food product is properly cooked or blanched.

While rotary blanchers have been improved in many ways, it has been believed to be heretofore impractical to blanch or cook only using steam because steam leakage would be so substantial that it would be too costly. Prior art rotary blanchers have been at best only partially steam-tight and have not been steam-tight about their entire periphery. It is known that at least one prior art commercial rotary blancher has a spaced apart pair of steam-tight water seals located where the sidewalls of the tank and cover meet with each seal extending longitudinally the length of the tank. Each water seal consists of a trough carried by the tank sidewall trough that receives one of the longitudinal edges of the lid sidewall. During operation, water partially fills the trough to create a seal between the trough and sidewall edge.

Such seals are effective at preventing the escape of steam along the longitudinal sides of the tank. However, significant amounts of steam can still escape along the seam where the endwalls of the lid and tank mate as there are no seals at these locations. In addition, steam can escape through the drum journal openings in the tank and lid endwalls, since clearance is provided around the drum journals to allow the drum to rotate freely. Steam can also escape from the drum inlet and outlet openings where food product is introduced and discharged since both are open to the atmosphere outside the blancher.

To prevent moisture from escaping from the atmosphere inside the blancher, some atmosphere within the blancher typically is continuously vented during operation to help create a negative pressure or vacuum within the blancher such that the pressure inside the blancher is less than the pressure outside the blancher. For example, for a blancher having a diameter of 5 feet and a length of 24 feet, about 1,500 cubic feet per hour of atmosphere would typically be evacuated from inside the blancher during operation. Despite this, some moisture and steam still leak from the blancher. Moreover, while this rate of venting is suitable to safely minimize increasing the humidity of the plant in which the blancher is operating using either water or a combination of water and steam, it is not suitable to prevent or suitably minimize steam leakage where such a rotary blancher is using only steam as the heat transfer medium.

While a small amount of steam leakage does not present a significant problem in the case of conventional hot water blancher operation, as steam is used to a greater extent to achieve higher temperatures and more rapid heat transfer, steam leakage can become a significant problem where only steam is used as the heat transfer medium One of the major expenses involved in processing food product in a blancher is the cost of energy needed for generating the steam or heating the water used to blanch the food product. Thus, loss of steam results in energy loss that wastes money. In addition, if steam is allowed to escape into the factory it can condense and drip onto food product which can result in its contamination and loss. Moreover, increased humidity in the factory caused by the escape of significant amounts of steam can contribute to worker fatigue, and will result in generally less than desirable working conditions, slippery and hazardous factory floors, and accelerated corrosion of food processing equipment within the factory. Minimizing the amount of steam that escapes from a blancher is thus highly desirable.

Rotary blanchers using only steam as a heat transfer medium are believed to be capable of processing food product as much as 10–20% faster than prior art rotary blanchers. Rotary blanchers using only steam at a pressure greater than the ambient atmospheric pressure are believed to be capable of processing food product as much as 600% faster than prior art rotary blanchers. However, due to the problems noted above, it has not heretofore been commercially achievable.

What is needed, therefore, is a rotary blancher that is sufficiently steam-tightly sealed so as to enable the rotary blancher to blanch or cook by heating using only 1) a vapor, 2) a heated gas, or 3) a combination of vapor/gas and a liquid with the vapor/gas inside the blancher at a pressure greater than the ambient pressure outside the blancher. What is also needed is a rotary blancher that permits food product to be substantially continuously introduced into the blancher and substantially continuously discharged from the blancher without disturbing the seal of the blancher enabling the blancher to maintain a pressure inside the blancher that is greater than the ambient pressure outside the blancher.

SUMMARY OF THE INVENTION

A method of operation of a sealed and positively pressurized blancher for blanching or cooking food product by heating. The blancher has a substantially-sealed housing that defines a chamber inside the housing for receiving food product. A substantially-sealed food product inlet permits food product from outside the blancher to be introduced into the blancher where it is heated. A substantially-sealed food product outlet enables food product from within the chamber to be discharged from the blancher after it has been sufficiently heated. A rotary food product transport mechanism inside the housing rotates during operation to urge food product inside the blancher toward the food product outlet.

The blancher housing is tubular and elongate such that it preferably has a length greater than its width or diameter. The housing preferably is carried by a frame that has legs which space the housing above a surface, such as a floor or the ground. The housing has a pair of spaced apart ends with an inlet opening in one end that is in communication with the substantially-sealed food product inlet and a discharge opening in the other end that is in communication with the substantially-sealed food product discharge. In one preferred housing embodiment, the housing is of two-piece construction having a tank with a lid removably attached to the tank. In another preferred embodiment, the housing is of one-piece construction. An example of a suitable housing of one-piece construction is a pressure vessel.

The rotary food product transport mechanism is constructed and arranged to urge food product received in the blancher toward the food product outlet by rotation of the rotary food product transport mechanism. In one preferred embodiment, the rotary food product transport mechanism comprises an auger or a screw received inside the housing. Preferably, the auger/screw has at least one lift adjacent the food product outlet for lifting food product inside the blancher to the food product outlet so it can be discharged from the drum.

Preferably, the auger or screw is received inside a drum that is also located inside the blancher housing. The drum has a pair of openings with one of the openings in communication with the food product inlet for accepting food product into the drum and the other one of the openings in communication with the food product outlet for enabling the food product to be discharged from the drum and out the blancher. The drum also has at least one other opening for allowing a heat transfer medium to enter the drum and contact the food product in the drum to heat the food product in the drum. In one preferred drum embodiment, the drum is of generally cylindrical construction and has a sidewall that is of perforate construction in that it has at least a plurality of pairs of perforations in the sidewall that permit heat transfer medium to enter the drum. By its construction, the drum can accommodate several hundred and preferably as many as several thousand food products at a given moment of blancher operation. Preferably, the auger/screw and the drum are constructed and arranged to rotate in unison or substantially in unison. In one preferred embodiment, the auger/screw is attached to the drum such that rotating the drum rotates the auger/screw.

The substantially-sealed food product inlet comprises a housing with an intake and a discharge and has at least a pair of spaced apart movable walls that seal with the housing and define a movable chamber therebetween that receives the food product from the intake where it is transported to the discharge into the blancher. In a preferred embodiment, the substantially-sealed food product inlet comprises a rotary valve driven by a drive that can be an electric motor. Where the substantially-sealed food product inlet comprises a rotary valve, the walls comprise vanes of a rotor of the valve that is rotated by the motor during blancher operation. By its construction, the substantially-sealed food product inlet is capable of introducing several hundred or even several thousand food products into the blancher continuously or substantially continuously during blancher operation. For example, a preferred embodiment of the rotary valve is capable of introducing at least about 20,000 pounds per hour and as much as about 50,000 pounds per hour of food product into the blancher.

The substantially-sealed food product outlet preferably comprises a housing with an intake and a discharge and has at least a pair of spaced apart movable walls that seal with the housing and define a movable chamber therebetween that receives heated food product from the intake where it is transported to the discharge where it is discharged from the blancher. In a preferred embodiment, the substantially-sealed food product outlet also comprises a motor-driven rotary valve. By its construction, the substantially-sealed food product outlet is capable of continuously or substantially continuously accepting for discharge from the blancher several hundred or even several thousand food products during blancher operation.

Because the blancher is sealed or substantially sealed, an atmosphere within the blancher is pressurized during operation to a pressure greater than a pressure of an atmosphere outside the blancher to increase the efficiency of the transfer of heat to the food product within the blancher. Preferably, the atmosphere within the blancher is pressurized to a pressure of at least about 15 pounds per square inch (psi) and can be pressurized to a pressure of at least about 15 psi greater than the pressure of the atmosphere outside the blancher. In another embodiment, the atmosphere within the blancher can be pressurized to a pressure of at least about 25 psi and can be pressurized to a pressure of at least about 25 psi greater than the pressure of the atmosphere outside the blancher.

To heat the food product inside the blancher, a heat transfer medium that is comprised of a heated gas or a heated vapor is introduced into the blancher. In one preferred embodiment, the heat transfer medium is comprised of steam injected into the blancher at a pressure of at least about 100 psi. In another embodiment, heated air can be introduced into the blancher to heat or help heat the food product. The heat transfer medium can also comprise a heated liquid. A preferred heated liquid is water heated to a temperature of at least about 160° Fahrenheit. In one preferred embodiment, the heat transfer medium comprises steam and hot water.

In a preferred method of operation, at least one heat transfer medium is introduced into the blancher and the atmosphere inside the blancher is pressurized to a pressure greater than the ambient pressure outside the blancher. Food products are continuously or substantially continuously introduced into the blancher through the food product inlet. The food products inside the blancher are blanched or cooked by heating due to heat transferred to the food products from the heat transfer medium or heat transfer media inside the blancher. Rotation of the rotary food product transport mechanism urges the food products inside the blancher toward the food product outlet. When the food products reach the food product outlet, the food products are discharged from the blancher through the food product outlet.

Objects, features, and advantages of the present invention include: a method of operating a blancher that more quickly and efficiently heats food product because it is positively pressurized at a pressure greater than ambient pressure; a blancher that is shorter and smaller and which can continuously or substantially continuously cook or blanch the same amount of food product as compared to a blancher that is not sealed or substantially sealed; a blancher that is versatile in that it can utilize many different kinds of heat transfer media; a blancher that is capable of operating using only steam, steam and water, or solely water as its heat transfer medium; a blancher that capable of cooking or blanching at least twice as fast and as much as six times faster than a blancher that is not positively pressurized; a blancher that can be made as much as 50% shorter than a blancher that is not positively pressurized; and is a blancher that is rugged, simple, flexible, reliable, and durable, and which is of economical manufacture and is easy to assemble, install, and use.

Other objects, features, and advantages of the present invention will become apparent to those skilled in the art from the detailed description and the accompanying drawings. It should be understood, however, that the detailed description and accompanying drawings, while indicating at least one preferred embodiment of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout and in which:

FIGS. 4A–4F depict some suitable, exemplary seals disposed between the tank and a cover of the rotary blancher;

DETAILED DESCRIPTION OF THE INVENTION

Figure 1:
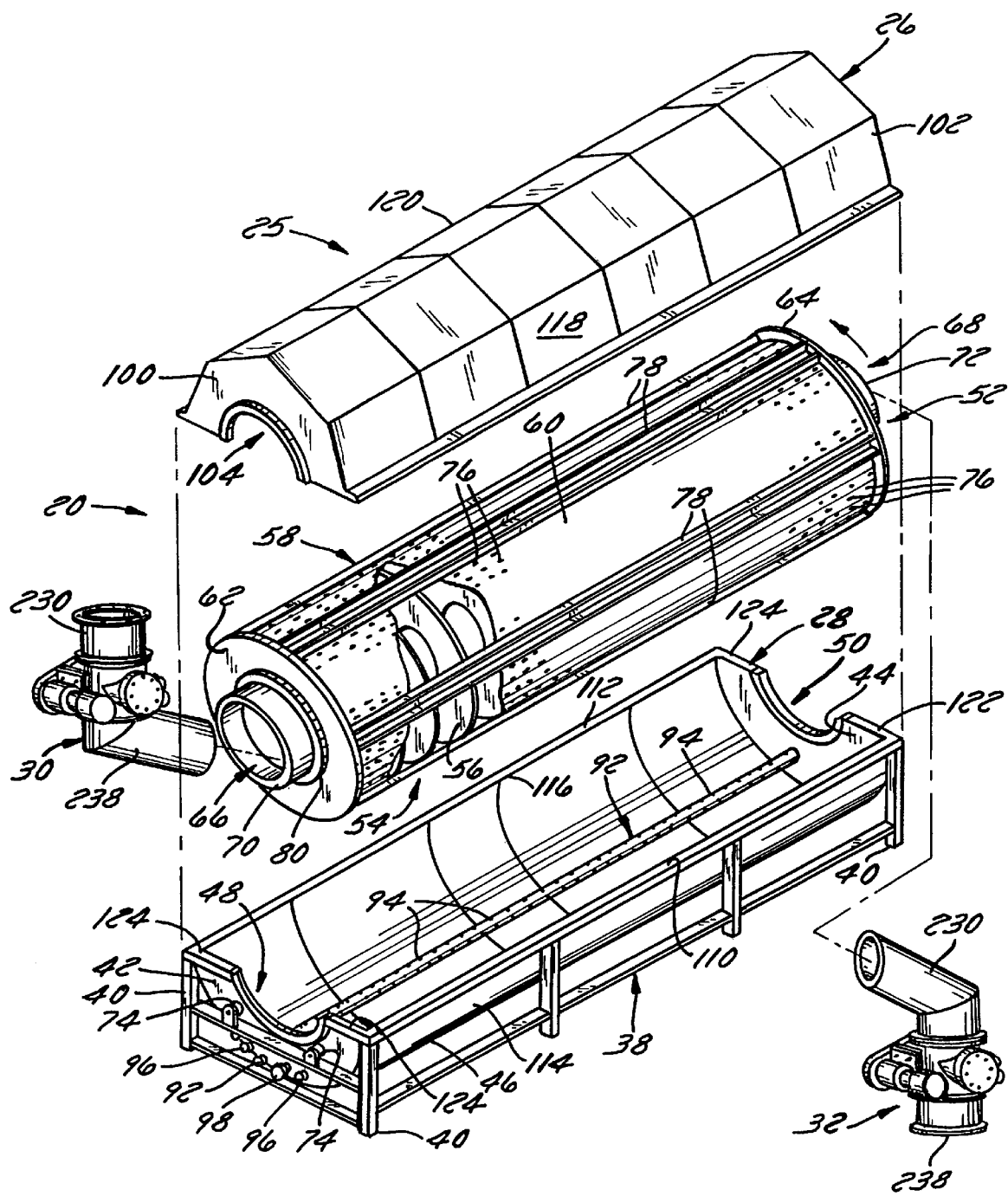
FIG. 1 is a partially exploded perspective view of a rotary blancher of this invention.

FIGS. 1–11 illustrate a rotary blancher 20 of this invention that is sealed and pressurized during operation to decrease the amount of time food product 22 must reside within the blancher 20 during blanching or cooking of the food product 22 (FIG. 2) by heating. The blancher 20 has a sealed chamber 24 that includes a housing 25 preferably comprised of a lid 26 sealed about its periphery where it mates with a tank 28 and can hold a heated liquid, a heated gas, a heated vapor, or a combination thereof, as a heat transfer medium.

To permit food product 22 to be introduced into the blancher 20 and food product 22 to be discharged from the blancher 20, all while maintaining a substantially gas-tight seal, the blancher 20 has a sealed inlet 30 and a sealed outlet 32, preferably in the form of the air-lock food product handling apparatuses 30 and 32 shown in FIGS. 2 and 7–9. Each air-lock food product handling apparatus 30 and 32 is of substantially gas-tight construction and preferably is substantially gas-tightly secured to the blancher 20 in a manner that minimizes and preferably substantially completely prevents escape of heated and pressurized atmosphere 34 from within the blancher 20 such that the blancher 20 can be positively pressurized.

As a result of the blancher 20 being substantially completely sealed, the atmosphere 34 within the blancher 20 can be maintained at a pressure greater than the pressure of the atmosphere 36 outside of the blancher 20. This advantageous construction increases the efficiency of the blancher 20 by decreasing how long it takes for the blancher 20 to heat food product 22 inside the blancher 20 to a desired temperature. By positively pressurizing the heated atmosphere within the blancher 20, the blancher 20 of this invention can be shorter in length and preferably smaller in transverse cross-section while substantially continuously processing the same or a greater amount of food product in the same amount of time as compared to a conventional blancher (not shown) that is not substantially completely sealed. The blancher 20 of this invention is also versatile because it can blanch or cook food product (a) using a solely liquid heat transfer medium, such as hot water, (b) a combination of a liquid and a gaseous or vaporous heat transfer medium, such as water and steam, water and water vapor, or water and hot air, (c) solely a vaporous heat transfer medium, such as steam, a heated gas that is not steam, or another heated vapor, or (d) solely a gaseous heat transfer medium, such as hot air or another gas.

A partially exploded view of the blancher 20 is shown in FIG. 1. The blancher tank 28 is cradled by a frame 38 that has legs 40 which support the blancher 20 on a surface that can be a floor or the ground. The tank 28, preferably made of stainless steel or another material suitable for food processing applications, has an endwall 42 at its inlet end and an endwall 44 at its outlet or discharge end. The endwalls 42 and 44 are attached to an elongate recessed tank bottom 46 that preferably is of curvilinear cross-section. The tank bottom 46 may be a single, continuous curved plate or panel running lengthwise between endwalls 42 and 44, or may be made of several long flat plates or panels positioned side by side and angularly joined together to form the shape of a curve overall. The inlet-side endwall 42 has an arcuate or semicircular cutout or opening 48 and the outlet-side endwall 44 has an arcuate or semicircular cutout or opening 50.

The blancher 20 includes a rotary food product transport mechanism 52 that is received in the chamber 24 and which is disposed between the lid 26 and the tank 28. The food product transport mechanism 52 is constructed and arranged to urge food product 22 in the blancher 20 from adjacent the inlet end of the blancher 20 toward the outlet end of the blancher 20. In its preferred embodiment, the food product transport mechanism 52 comprises a helical auger or screw 54 received within the blancher 20 that is rotated during blancher operation. The auger 54 has a plurality of axially spaced apart and interconnected flights 56 that spiral substantially the length of the interior of the tank 28. While the flights 56 can be attached to a cylindrical core 57 (FIGS. 9 and 10) that helps provide structural rigidity, the auger 54 can be of coreless construction (FIGS. 1 and 2), if desired.

Figure 2:
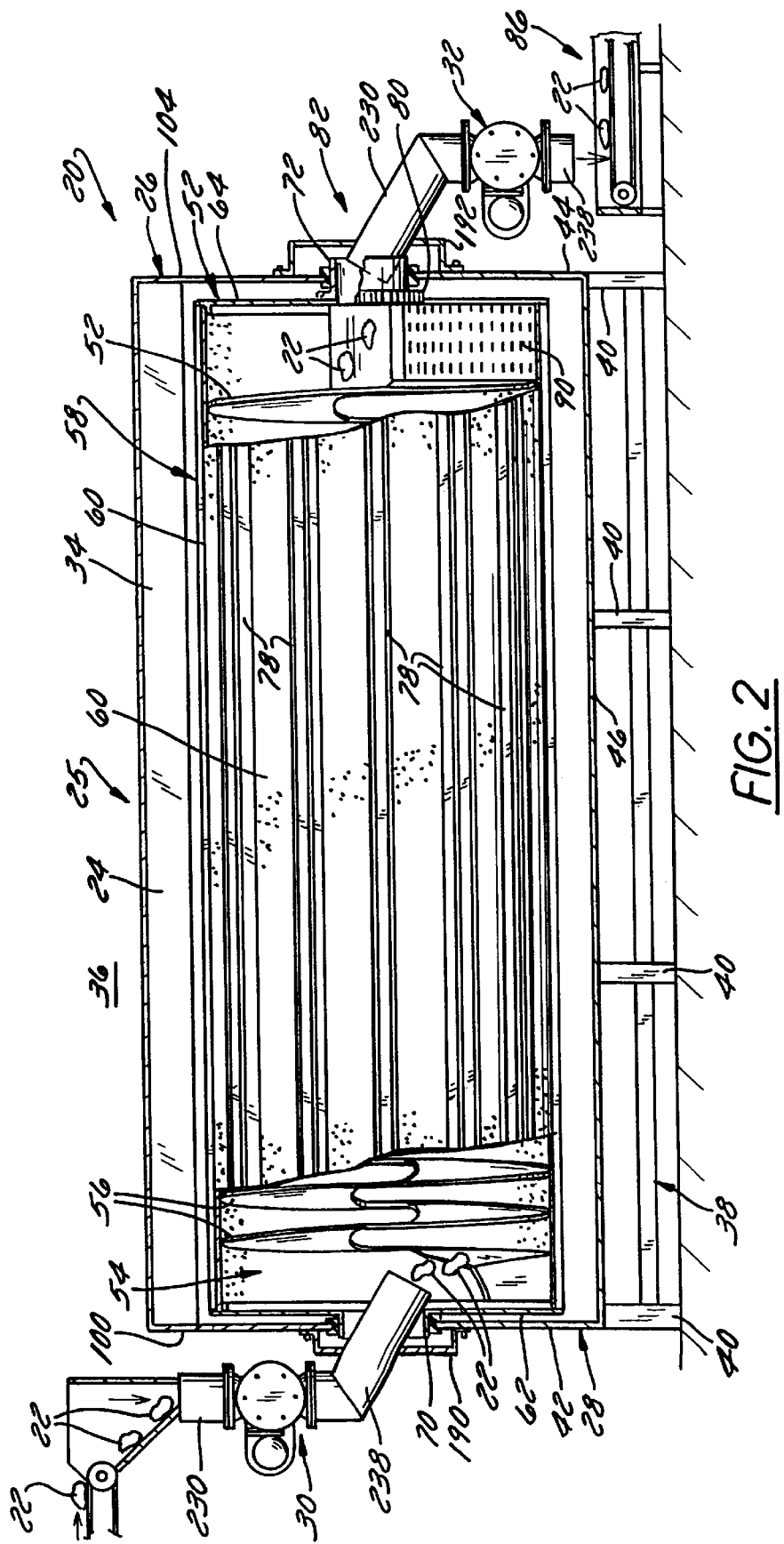
FIG. 2 is a side sectional view of the rotary blancher.
Figure 5:
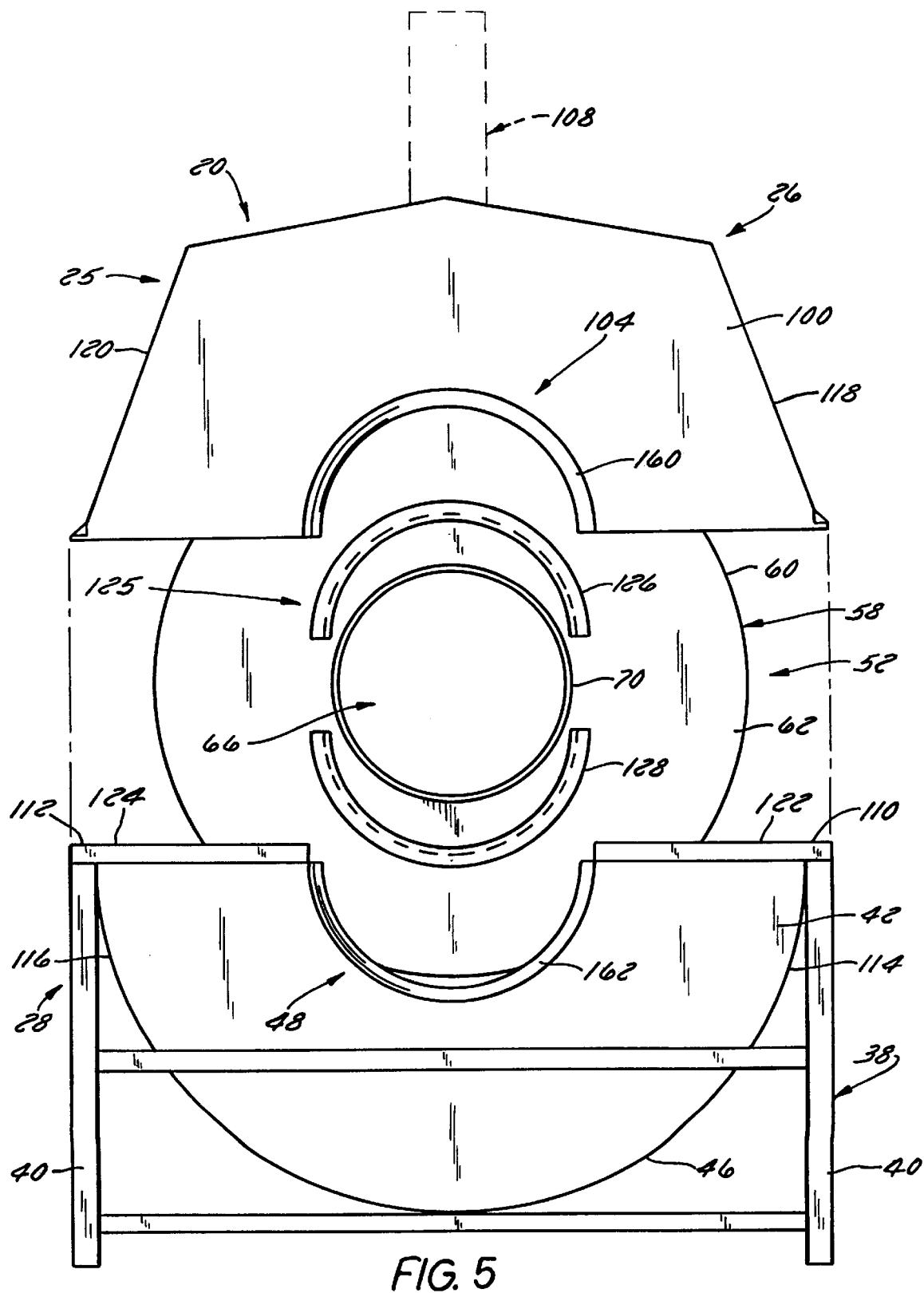
FIG. 5 is a partially exploded end view of the blancher.

Referring to FIGS. 1, 2 and 5, the auger 54 preferably is received in a drum 58 that is received in the blancher chamber 24. The drum 58 has a sidewall 60, an inlet-end plate 62, an outlet-end plate 64, and inlet and outlet openings 66 and 68, through which food product 22 respectively is introduced and discharged. The drum 58 has an inlet-end annular journal 70 that extends outwardly from the inlet-end plate 62 preferably beyond tank endwall 42 and an outlet-end annular journal 72 that extends outwardly from the outlet-end plate 64 preferably beyond tank endwall 44. Each of the journals 70 and 72 is rotatively supported by trunnions 74 which are mounted to the frame 38 and which are preferably positioned so that the entire weight of the drum 58 does not rest upon the tank endwalls 42 and 44.

The drum 58 is constructed and arranged to receive food product 22 and to allow a heat transfer medium to enter the drum 58 in a manner such that the heat transfer medium (or media) can heat the food product 22 in the drum 58. In the preferred embodiment, the drum sidewall 60 has a plurality of pairs of perforations 76 (exaggerated for clarity) about its circumference and is preferably made of a plurality of perforate panels, mesh, or a screenlike material in order to contain the food product 22 in the drum 58 while at the same time permitting heat transfer medium (or media) to enter the interior of the drum 58 and contact the food product 22.

Particularly where the auger 54 is of coreless construction, the drum 58 preferably has circumferentially spaced apart struts 78 that extend in an axial direction from one drum end plate 62 to the other drum end plate 64 to help increase the strength and structural rigidity of the drum 58 and auger 54. These struts 78 preferably can also serve as mounts to which portions of the perforate drum sidewall 60 are removably fastened.

During operation, the drum 58 and auger 54 preferably rotate substantially in unison. If desired, the blancher 20 can be constructed such that the auger 54 rotates relative to or independently of the drum 58 to transport food product 22 through the blancher 20. While use of a drum 58 is preferred, the drum 58 or its sidewall 60 may not be needed. If desired, the auger 54 can solely comprise the rotary food product transport mechanism 52.

The auger 54 is driven by a drive or motor (not shown) that transfers power preferably via an endless flexible connector, such as a belt, a chain or the like (also not shown), to a drive sprocket 80 carried by at least one of the drum journals and/or end plates, such as is shown in FIGS. 1 and 2. If desired, other means may be used to rotate the auger 54. While the sprocket 80 can be disposed inside the blancher 20, such as is shown in FIG. 2, the sprocket 80 preferably is disposed exteriorly of the endwall of the lid 26 and the endwall of the tank 28. So as to preserve the seal of the blancher 20, the shroud 192 adjacent the sprocket 80 can extend downwardly to permit a drive or driven shaft (not shown) to extend through the shroud 192 in a sealed manner to communicate power from an externally-located drive or motor to the internally-located auger 54.

The auger 54 preferably rotates at a speed selected to achieve the desired cooking time for food product 22, thereby controlling the residency time of the food product 22 within the blancher 20 by controlling the time of exposure to the heat transfer medium or media. Variables such as the type, size, volume, mass, and temperature of the food product 22 as well as the type of heat transfer medium or media, its temperature, and pressure, all play a part in determining the residency time for a particular food product 22. Routine experimentation and testing may be performed to determine the desired residency time for a particular food product 22 based on at least some of these variables. Typically, the auger 54 rotates between about one-half revolutions per minute (rpm) and about ten rpm but can rotate faster or slower if desired.

Referring to FIG. 2, when the food product 22 reaches the blancher outlet 82, it is transferred to the outlet 82 where it can be discharged onto a conveyor 86 or into a container. In the preferred embodiment shown in FIG. 2, the auger 54 has one or more radial lifting flights 90 adjacent the outlet 82 that are used to transfer food product 22 from the blancher 20 to the outlet 82. If desired, other arrangements can be used to transfer food product 22 from inside the blancher 20 to the outlet 82.

Referring to FIG. 1, the tank 28 is preferably equipped with one or more spaced vapor or gas inlets 92 through which gaseous or vaporous heat transfer medium can be introduced into the blancher chamber 24 during operation. Preferably, the inlets 92 are arranged in one or more tubular and elongate manifolds 92 that are each disposed in the tank 28 at or near the tank bottom preferably between the tank 28 and the drum 58. The blancher 20 preferably has a plurality of the manifolds 92. Each manifold 92 preferably comprises a pipe or tube having a plurality of pairs of spaced apart discharge ports, shown as exaggerated perforations 94 in FIG. 1, through which heat transfer medium is discharged.

Where steam is the heat transfer medium, steam is delivered to the manifolds 92 preferably under the control of one or more valves (not shown) which help regulate the flow rate and pressure of the steam. The steam may be automatically regulated or manually controlled to achieve the desired blanching or cooking conditions within the blancher 20. In a similar manner, compressed air may be communicated to the manifold 92 or another component for communicating compressed air into the blancher 20. Fixtures can also be provided at one end of the tank 28 for the introduction of a temperature sensing device such as a thermometer or thermocouple (not shown) for monitoring the temperature of the heat transfer medium inside the blancher 20.

The blancher 20 preferably also has an inlet 96 permitting introduction of a liquid heat transfer medium into the tank 28 and an outlet 98 for discharging the liquid heat transfer medium. If desired, there can be a constant flow of liquid heat transfer medium into and out of the blancher 20. The discharge outlet 98 can also be used to assist cleaning the interior of the tank 28.

The lid 26 is of preferably elongate and vaulted construction so as to fit over and completely cover the tank 28 so as to define the chamber 24 within which resides the food product 22, the auger 54, the drum 58, and the heat transfer media or medium. Each endwall 100 and 102 of the lid 26 has an opening, such as opening 104, positioned above the openings 48 and 50 in the tank endwalls 42 and 44 through which drum journals 70 and 72 extend. The lid 26 can be attached to the tank 28 in a manner such that it can be moved relative to the tank 28 to permit access to the interior of the blancher 20. For example, the lid 26 can be attached to the tank 28 by one or more hinges such that it may be opened from either side of the blancher 20. If desired, the lid 26 can be attached to the tank 28 such that it can be lifted free of the tank 28 using pneumatic or hydraulic cylinders or the like.

The lid 26, the tank 28, the auger 54 and the components of the drum 58 preferably are all made of durable and resilient materials suitable for use in food processing applications. One suitable example is stainless steel, such as T-304 stainless steel. Other suitable materials include T-316 stainless steel and Monel.

Where it is necessary to regulate the pressure of the atmosphere 34 inside the blancher 20 such as to relieve pressure, a vent 108, shown in phantom in FIG. 5, can be used to selectively remove some atmosphere, including vaporous and/or gaseous heat transfer medium (or media), from within the blancher 20. Where a vent 108 is used, the vent 108 can include one or more dampers (not shown) disposed in the vent 108 to help regulate flow. If desired, a blower or fan (not shown) in communication with the vent 108 can be used to help draw atmosphere out from within the blancher 20. Should venting be performed during operation of the blancher 20, venting preferably is selectively performed to help ensure that the pressure loss due to venting is not so great so as to reduce the pressure of the atmosphere 34 within the blancher 20 to less than the ambient pressure of the atmosphere 36 outside the blancher 20. Preferably, venting is generally not performed at all or only occasionally performed during operation of the blancher 20 to ensure that the pressure inside the blancher 20 remains above the outside ambient pressure to help reduce the residency time of food product 22 within the blancher 20.

To enable the atmosphere within the blancher 20 to reach a pressure greater than the pressure outside of the blancher 20, the blancher 20 of this invention is constructed so as to be substantially-completely sealed. Where the heat transfer medium includes steam, the seal is substantially-completely steam-tight. Where a gaseous, non-liquid, or vaporous heat transfer medium is used, the seal provided preferably is substantially-completely gas-tight or air-tight such that any leakage does not adversely affect the ability of the blancher 20 to achieve and sustain during operation pressures greater than ambient pressure.

The blancher 20 is sealed between the tank 28 and lid 26 about the periphery where the tank 28 and lid 26 meet when the lid 26 is closed (FIG. 2). The blancher 20 is also sealed between the lid 26 and the drum journals 70 and 72 and between the tank 28 and journals 70 and 72. The inlet air-lock food product handling apparatus 30 permits food product 22 to be substantially continuously introduced into the blancher 20 while maintaining the seal. The outlet air-lock food product handling apparatus 32 permits food product 22 to be substantially continuously discharged from the blancher 20 while also maintaining the seal.

Figure 3:
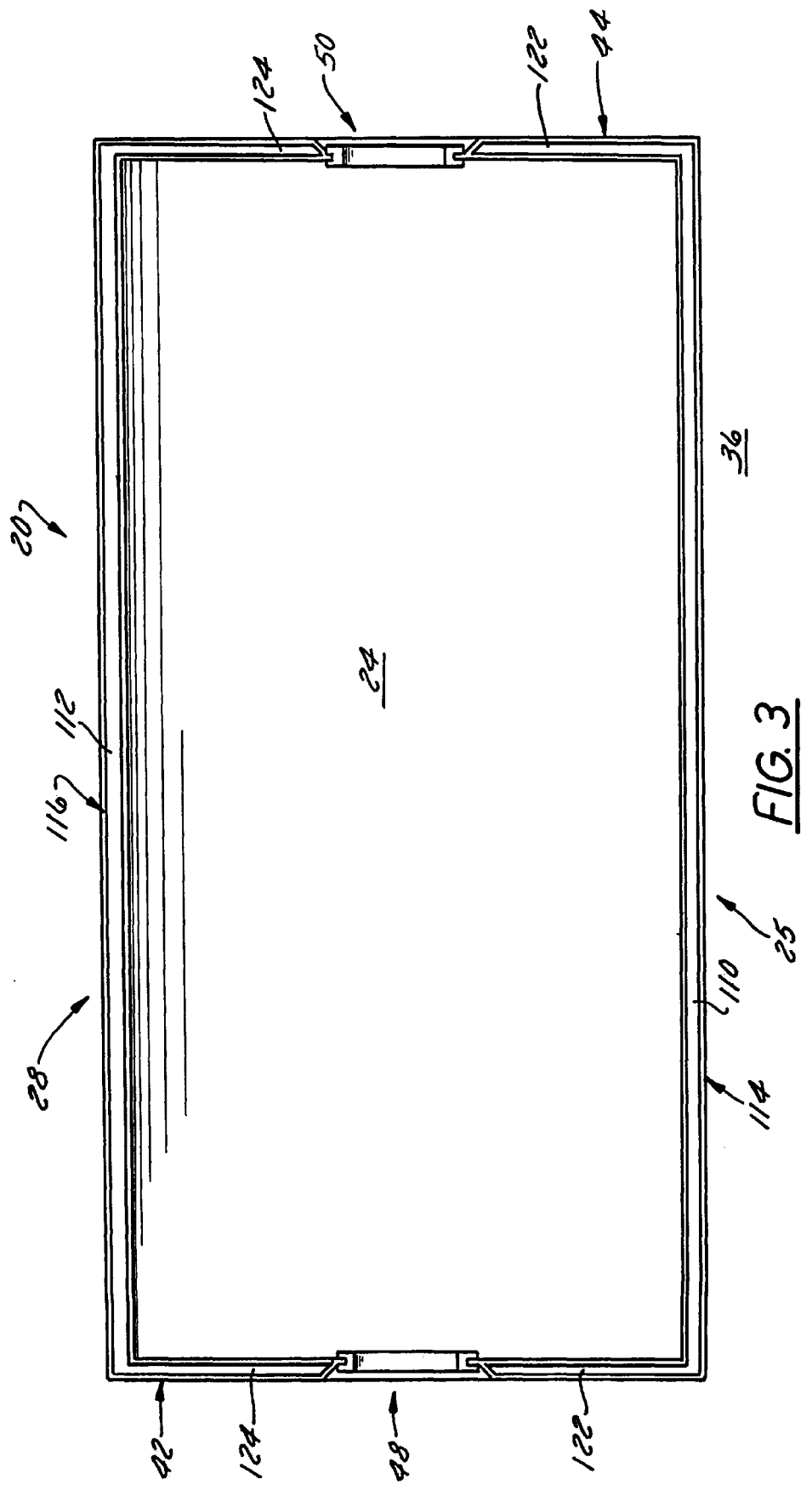
FIG. 3 is a top view of a tank of the rotary blancher with parts removed for clarity.

In the preferred embodiment, and as is best seen in FIG. 3, the tank 28 has a pair of spaced apart and lengthwise extending seals 110 and 112 disposed along the top edge of the tank sidewalls 114 and 116 for sealing with the longitudinally extending bottom edge of the lid sidewalls 118 and 120. At each end, the tank 28 has a pair of transversely extending seals 122 and 124 for sealing with the transversely extending bottom edge of the lid endwalls 100 and 102. As is shown in FIG. 5, there also is a pair of arcuate seals 126 and 128 at each end with one seal 126 disposed between each drum journal 70 and 72 and its corresponding lid endwall opening 104 and the other seal 128 located between the drum journal 70 and 72 and tank endwall opening 48 and 50.

FIGS. 4A–4F illustrate some exemplary and preferred embodiments of seals 110, 112, 122, and 124. For purposes of convenience when discussing FIGS. 4A–4F, the seals are collectively referred to herein as reference numerals 110a–110f.

FIG. 4A depicts the seal 110a as comprising a channel 130 carried by a sidewall 114 of the tank 28 that receives the bottom edge of the lid 26. The channel 130 has a bottom wall 132 cantilevered outwardly from the tank sidewall 114 to which an outer lip 134 is secured. The tank sidewall 114 comprises the inner wall of the channel 130. To help support the weight of the lid 26 received in the channel 130, the joint between the bottom wall 132 and the tank 28 can be reinforced by longitudinally spaced apart angle irons, struts, or the like, each of which bears reference numeral 136 and extends from the bottom wall 132 to the tank sidewall 114.

When the lid 26 is closed, the bottom edge of the lid sidewall 118 is received in the channel 130. In its preferred embodiment, the bottom edge has a generally perpendicularly outwardly extending leg 138. Longitudinally spaced apart angle irons 140, or the like, that extend from the leg 138 to the sidewall 118 help reinforce the attachment between the leg 138 and sidewall 118.

The channel 130 is constructed so as to receive and preferably retain moisture or a liquid 142, preferably water, that contacts the lid leg 138 creating a seal 110a that preferably is gas-tight and which is substantially steam-tight. While a sufficient amount of moisture preferably condenses within the channel 130 during blancher operation to form the seal 110a, water or another liquid can be pumped into the channel 130 to create the seal 110a, if desired. While the layer of liquid 142 is shown extending well above the lid leg 138, the layer of liquid 142 need only be a thin film between the channel bottom wall 132 and the leg 138.

FIG. 4B depicts a seal 110b similar to that shown in FIG. 4A, but further includes a seal 144, or the like, disposed between the bottom of the lid leg 138 and the channel bottom wall 132. Seal 144 preferably is made of rubber, plastic, or a flexible, synthetic material that can be an elastomer, a polymer, or another material. Seal 144 preferably is constructed of a food grade material or a material safe for use in food processing applications. For example, the seal 144 can be constructed of a foam (such as a closed cell foam), neoprene, polyethylene, ultra high molecular weight polyethylene, silicone rubber, urethane, polyester, nylon, silicone, fluoroelastomer, VITON, TEFLON, or another suitable material. If desired, the seal 144 can comprise weatherstripping.

The seal 144 provides a steam-tight and preferably a gas-tight seal between the tank 28 and lid 26 even when no liquid 142 is present in the channel 130. Thus, seal 144 is intended to provide a suitable seal between the lid 26 and tank 28 whether or not there is liquid 142 in the channel 130 and whether or not there is a channel present. In the seal embodiment shown in FIG. 4B, seal 144 comprises a pair of spaced apart sealing strips 146a and 146b for providing two complementary seals that preferably seal independently of each other and independently of any liquid in the channel 130.

FIG. 4C shows a seal 110c similar to the seal 110b depicted in FIG. 4B except that seal 144 is of one-piece construction. FIG. 4D shows a seal 110d similar to seal 110c except that seal 144 is of two-piece construction having one seal strip 148 attached to the channel bottom wall 132 and another seal strip 150 attached to the lid leg 138.

FIGS. 4E and 4F depict seal embodiments that do not rely on any liquid to provide the seal between the tank 28 and lid 26. FIG. 4E depicts the sidewall 118 of the lid 26 terminating at an edge 152 and the sidewall 114 of the tank 28 having a right-angled leg 132 supported by angle iron 136. A generally U-shaped sealing strip 154 is received over the lid sidewall edge 152 and rests upon leg 132 when the lid 26 is in its closed position providing a seal 110e between the lid 26 and tank 28.

FIG. 4F depicts a sealing skirt 156 attached to the lid sidewall 118 which extends downwardly and contacts leg 132 to provide a seal 110f therebetween. If desired, a second skirt 158 (shown in phantom) can be attached to the opposite side of the sidewall 118 and extend downwardly into contact with tank 28.

Referring to FIG. 5, there is a seal 125, preferably of two-part construction, at each end of the blancher 20 that is disposed between the lid 26 and drum journal and the tank 28 and drum journal. For the purpose of simplifying explanation, only the construction of the seal 125 at the inlet end of the blancher 20 is presented. The seal 125 preferably extends completely about the periphery of the journal 70. Upper seal 126 comprises a sealing strip that is attached to the lid end wall 100 and bears against the journal 70. Lower seal 128 comprises a sealing strip attached to the tank end wall 42 and also bears against the journal 70. Preferably, the upper seal 126 is arcuately shaped and mounted to an arcuate tapered region 160 of the lid end wall 100 that bounds drum journal opening 104. Preferably, the lower seal 128 is mounted to an arcuate tapered region 162 of the tank end wall 42 that bounds drum journal opening 48. If desired, the seal 125 can be of one-piece construction, such as an O-ring or the like.

Figure 6D:
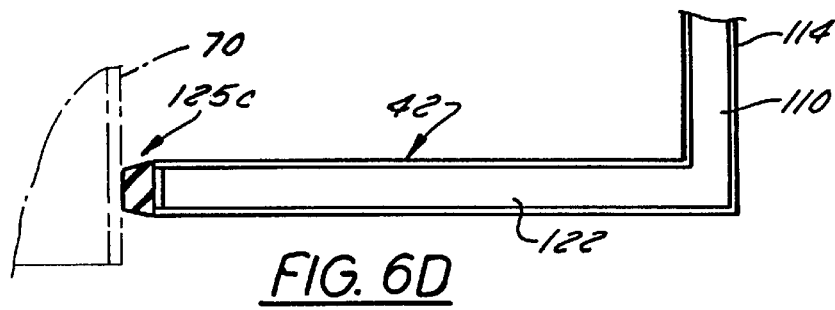
FIGS. 6A–6F depict some suitable, exemplary seals disposed between the drum journal and cover or tank.
Figure 6C:
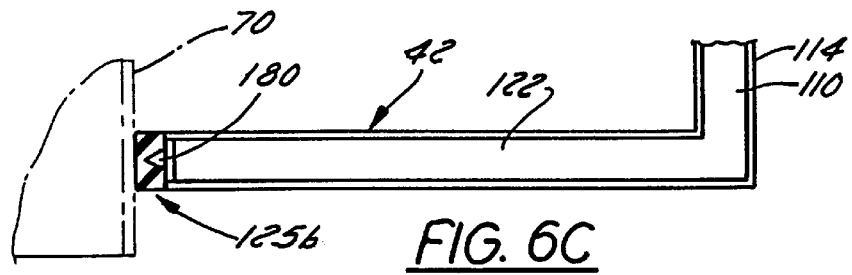
Figure 6A:
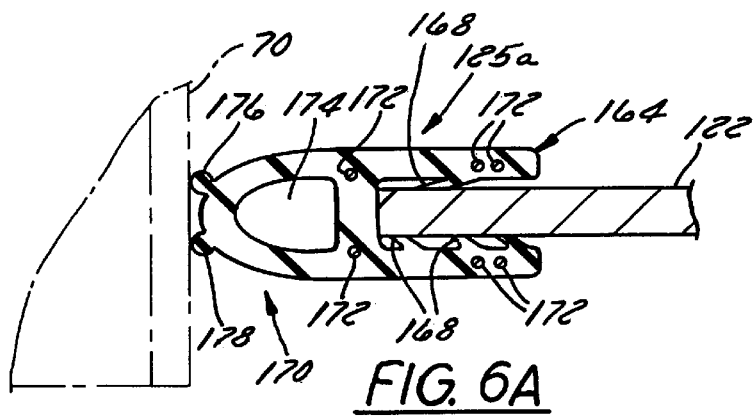
Figure 6B:
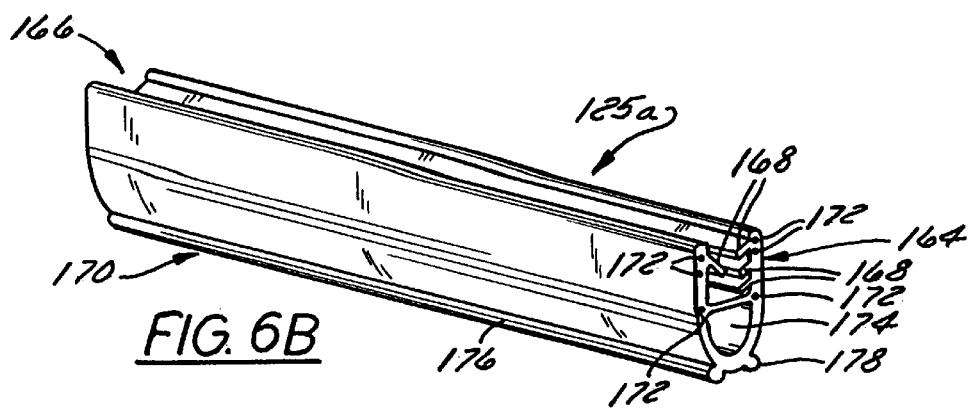

FIGS. 6A–6F illustrate a number of various exemplary suitable drum journal seals 125. FIGS. 6A and 6B illustrate a preferred embodiment of the seal 125a having a body 164, of generally U-shaped cross-section, with an elongate channel 166 in one side for receiving an edge of either the tank endwall 42 or the lid endwall 100 (FIG. 5). Received within the channel 166 are a plurality of inwardly extending and canted fingers 168 to create a tight friction fit between the seal 125 and the endwall 42 or 100 for resisting removal from the endwall. The other side of the seal body 164 preferably is continuous and rounded and forms a sealing surface 170 that bears against the journal 70.

To help form the seal 125a and provide durability, the seal body 164 can be reinforced with a plurality of wires 172 or the like. To help give the seal compressibility for enabling the seal to compress at least somewhat when it bears against the journal 70, the seal 125a has a hollow 174 adjacent the sealing surface 170. The sealing surface 170 preferably also has a pair of spaced apart elongate sealing lobes 176 and 178 that each extend substantially the length of the seal 125a and which each bear against the journal 70. The lobes 176 and 178 preferably help provide redundant or complementary seals.

The seal 125a preferably is constructed of a resilient and durable material. The seal 125a can be comprised of a rubber, plastic, elastomer, polymer, or another suitable seal material. To help the seal 125a resist wear due to rotation of the drum 58 or the journal, the seal 125a can be made of a self-lubricating material, impregnated with a lubricant, or made of a material possessing a great deal of resistance to friction. Some exemplary and preferred seal materials include nylon, TEFLON, polyester, neoprene, fluoroelastomer, urethane, polyethylene, ultra-high molecular weight polyethylene, silicone, silicone rubber, VITON, or another suitable seal material. Preferably, the seal 125a is made of food grade material or a material suitable for use in food processing applications. A lubricant can also be externally applied to the seal 125a, if desired. Examples of suitable lubricants include silicone, TEFLON or white lithium grease. Preferably, the lubricant is a food grade material that is safe for use in food processing applications.

FIG. 6C depicts a seal 125b carried by the tank endwall 42 that is of resilient and flexible construction and which has a recess 180 for facilitating compression and flexure of the seal 125b, to help, for example, accommodate drum wobble due to eccentricity, misalignment, or mislocation. FIG. 6D depicts another seal 125c that can be carried either by the drum 58, preferably its journal, or by the endwall 42.

Figure 6F:
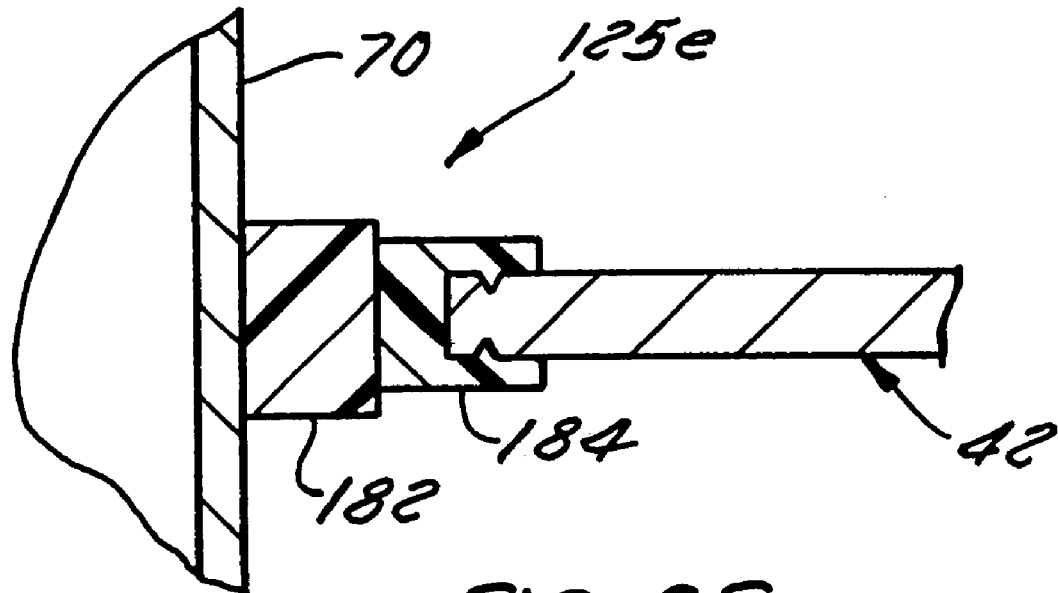
Figure 6E:
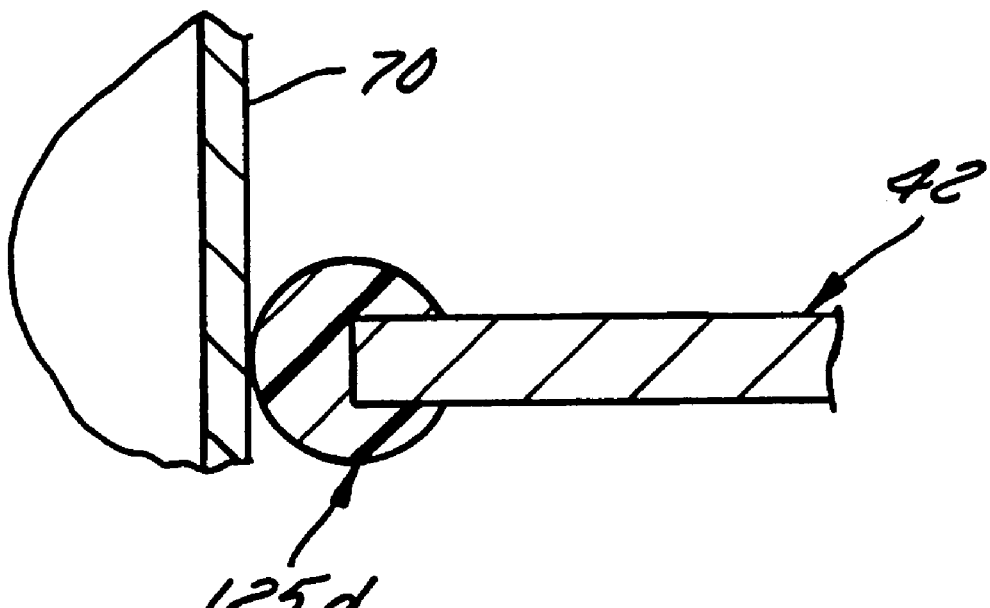

FIG. 6E illustrates a seal 125d of generally round cross-section. The seal 125d has a notch for receiving the edge of the endwall 42. FIG. 6F depicts a seal 125e comprising a first seal 182 carried by the journal 70 and another seal 184 carried by the endwall 42.

Figure 7A:
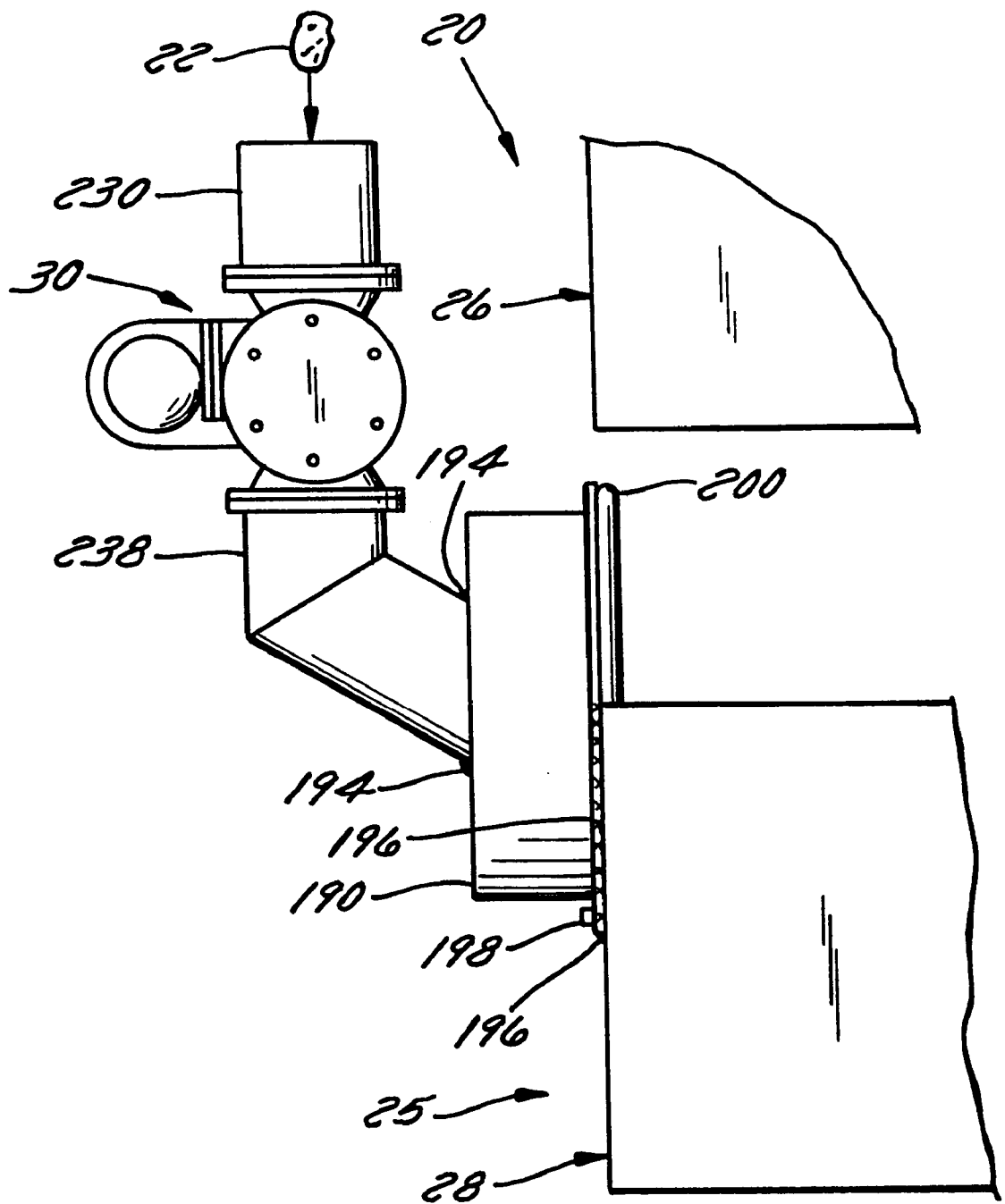
FIG. 7A is a side view of a shroud that mounts a food product air-lock apparatus to the blancher.

As is shown in FIGS. 2 and 7A, the inlet-end air-lock food product handling apparatus 30 is attached to the blancher 20 by a shroud 190 and the outlet-end air-lock food product handling apparatus 32 is attached to the blancher by a second shroud 192 that is similar to, if not the same as shroud 190. For this reason, only shroud 190 will be discussed in more detail further herein.

The shroud 190 preferably functions as a bracket that mounts to either one of or both the lid 26 and the tank 28. Where it is desired to move the lid 26 relative to the tank 28, such as to open the lid 26, the shroud 190 is mounted to only one of the lid 26 and the tank 28. The shroud 190 is sealed, such as by a weld 194 or the like, to the apparatus 30 completely or substantially completely about an inner periphery where the apparatus 30 and shroud 190 mate. The shroud 190 is also sealed both to the lid 26 and to the tank 28 preferably about the outer periphery of the shroud 190.

Preferably, the shroud 190 is sealed to one of either the lid 26 or the tank 28 by a weld 196 or another adhesive process that can provide at least part or all of a gas-tight or substantially gas-tight seal between the shroud 190 and blancher 20. If desired, the shroud 190 can be mounted to either the lid 26 or the tank 28 by fasteners 198, such as rivets, bolts, or the like, with a seal 200, such as a compressible sealing gasket or the like, disposed between the shroud 190 and that part of the blancher 20 against which that portion of the shroud 190 bears. Preferably, the seal 200 or another like seal is disposed between the other of either the lid 26 or the tank 28 to complete the seal between the shroud 190 and the lid 26 and the tank 28. Examples of some suitable seal cross-sectional configurations are shown in FIGS. 4B, 4C, 4D, 4E, 4F, and 6A–6F. Other types of seals and seal configurations can also be used.

Figure 7B:
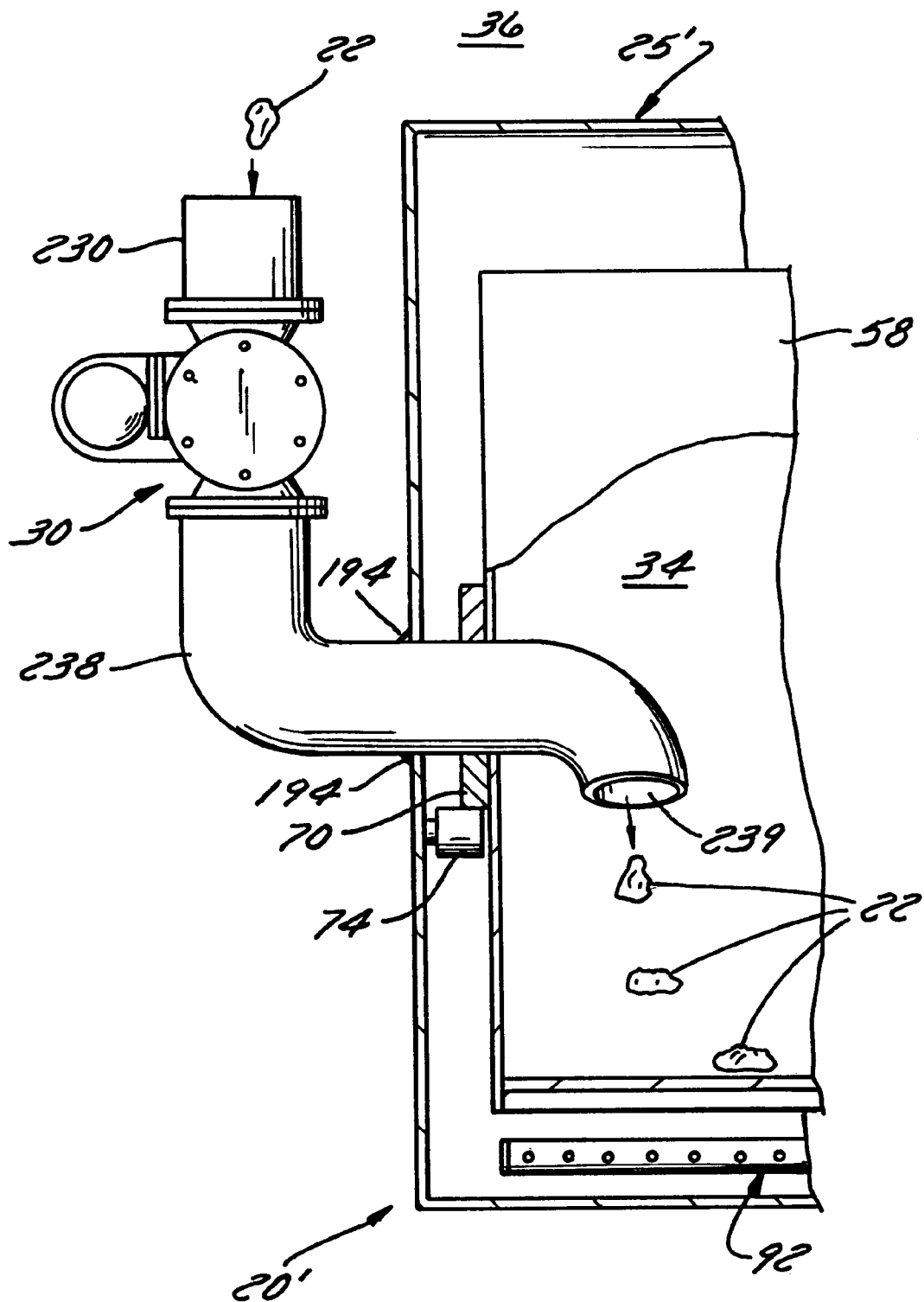
FIG. 7B is a side view of another mounting arrangement.

FIG. 7B illustrates another preferred blancher construction for facilitating mounting of one or both air-lock food product handling apparatuses to the housing 25'. Only the inlet end apparatus 30 is shown in FIG. 7B. The apparatus 30 is sealed to the housing 25' in a manner such that the atmosphere 34 within the blancher 20' is positively pressurized during operation. In a preferred mounting arrangement that also provides a seal between the apparatus 30 and the housing 25', the discharge chute 238 is attached to the housing 25' by a weld 194 about its outer periphery. If desired, the housing 25' of the blancher 20' can be of one-piece construction. One suitable example of a suitable one-piece blancher housing is a generally cylindrical and elongate pressure vessel.

The discharge chute 238 of the apparatus 30 extends through an inlet opening in the inlet end of the housing 25' and has an opening 239 received inside the housing 25'. At least part of the chute 238 preferably extends through an inlet opening defined by the drum journal 70 and into the interior of the drum 58. Each drum journal 70 and 72 is located inside the housing 25' and is rotatively supported by trunnions 74 thereby enabling the drum 58 to be rotated. Preferably, the drive (not shown) that rotates the drum 58 during operation is also disposed inside the housing 25 or has a shaft (not shown) that extends from outside the blancher 20' through the housing 25' to the interior of the blancher 20' to rotatively couple the drive to the drum 58.

Figure 8:
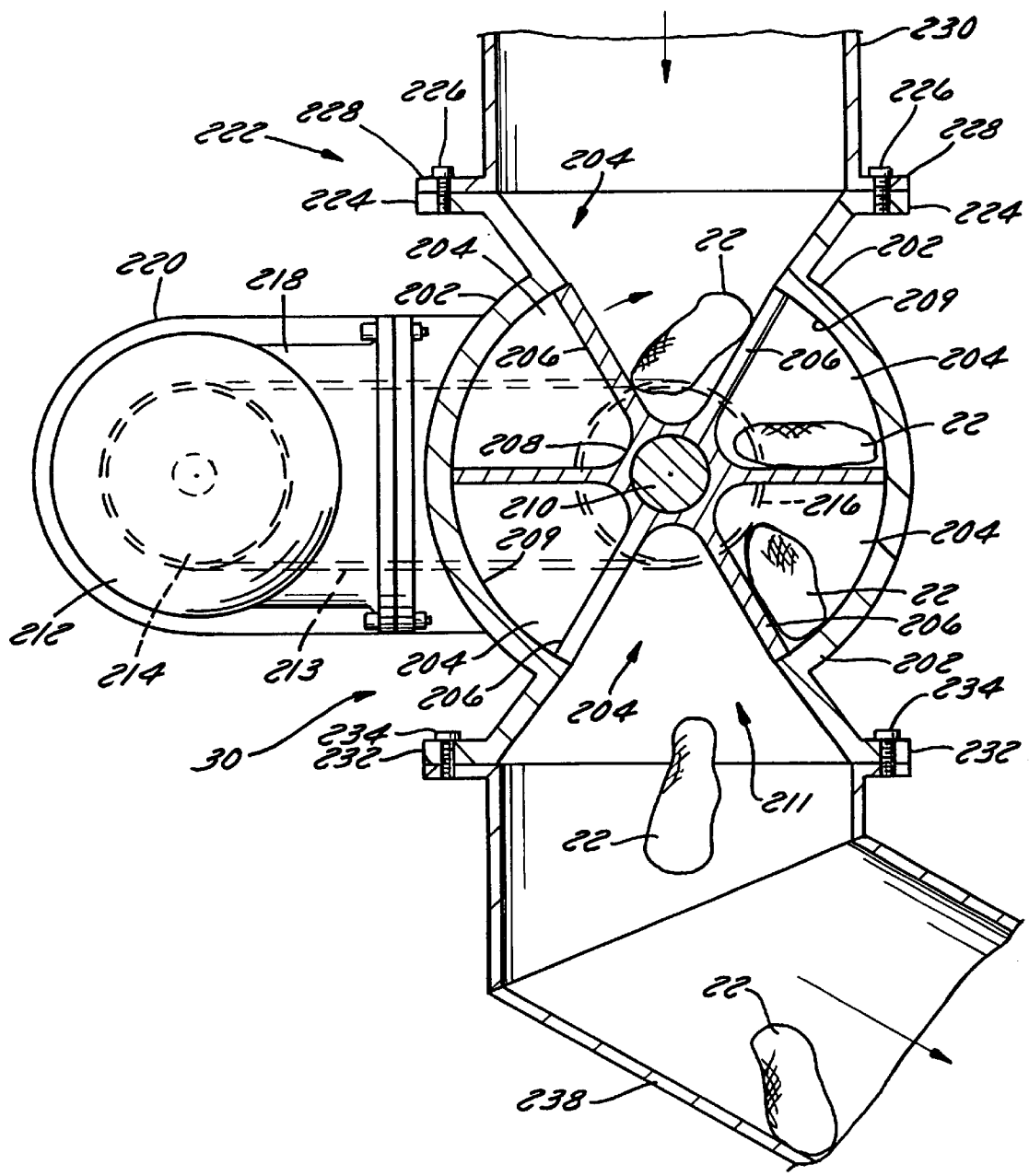
FIG. 8 is a cross sectional view of the food product air-lock apparatus.
Figure 9:
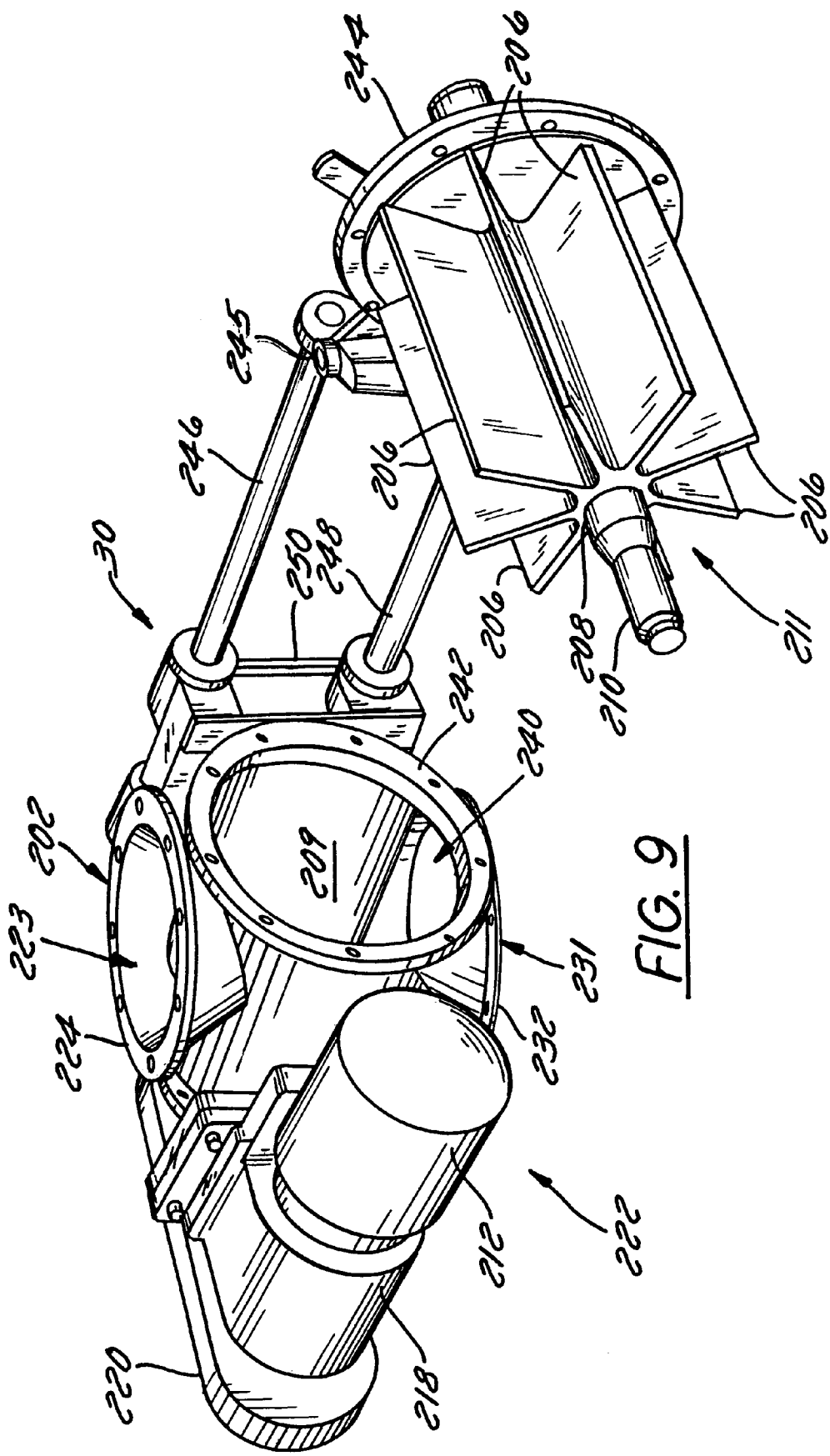
FIG. 9 is a perspective view of the food product air-lock apparatus.

FIGS. 8 and 9 illustrates a preferred air-lock food product handling apparatus 30 in more detail. Since the inlet-end air-lock food product handling apparatus 30 and the outlet-end air-lock food product handling apparatus 32 preferably are the same, only the inlet-end apparatus 30 will be described in more detail herein.

The inlet-end air-lock food product handling apparatus 30 comprises a sealed inlet through which food product 22 passes to enter the blancher 20 while maintaining or helping to maintain a sufficient seal such that the blancher 20 can be positively pressurized. Likewise, the outlet-end air-lock food product handling apparatus 32 comprises a sealed outlet or a sealed discharge through which food product 22 exits the blancher 20 while maintaining or helping to maintain a sufficient seal such that the blancher 20 can be positively pressurized.

The air-lock food product handling apparatus 30 has a housing 202 (not shown in FIG. 9) and a plurality of pairs of spaced apart and substantially sealed movable chambers 204 (not shown in FIG. 9) each constructed and arranged to receive at least one food product 22 and to transport the received food product 22 into the interior of the blancher 20 while maintaining the seal of the blancher 20. Each movable chamber 204 is comprised of a pair of spaced apart and movable vanes or walls 206. Each of the walls 206 extends radially outwardly from a spider or a core 208 toward the interior 209 of the housing 202 with a sufficiently small clearance therebetween such that the radially outer edge of each wall 206 effectively seals with the housing interior 209. Collectively the walls 206 and core 208 form a rotary paddle-wheel, a rotary wheel, or a rotor 211.

The core 208 is carried by an axle 210 driven by a prime mover 212, such as an electric motor or the like, that preferably is coupled to the axle 210 by a flexible connecting member 213 (shown in phantom in FIG. 8), that can be a belt, a chain or another type of connector. The flexible connecting member 213 preferably is received on a drive pulley 214 carried by the drive shaft of the motor 212 and a driven pulley 216 (shown in phantom in FIG. 8) carried by the axle 210. The prime mover 212 is attached to the housing 202 by a bracket 218 and the flexible connecting member 213 and pulleys 214 and 216 preferably are covered by a protective shroud 220.

In its preferred embodiment, the walls 206, core 208 and housing 202 comprise a sealed rotary valve 222 that forms the air-lock food product handling apparatus. The housing 202 has an intake 223 bounded by a top flange 224 that attaches by fasteners 226 to a flange 228 of intake chute 230. The housing 202 also has a discharge 231 bounded by a bottom flange 232 that attaches by fasteners 234 to a flange 236 of an outlet chute 238. If desired, a sealing gasket (not shown) can be provided between each pair of mated flanges to help seal the assembly 30.

As FIG. 9 illustrates, to permit cleaning of the walls or vanes 206 of the rotary wheel 211, the housing 202 has a port 240 bounded by a flange 242 attached by fasteners to an endplate 244 that carries the wheel 211. So that the endplate 244 and wheel 211 can be easily removed, they are mounted to the housing 202 by slides 246 and 248 and a bracket 250. Preferably, the endplate 244 is mounted by a hinge 245 to the slides 246 and 248. To facilitate reassembly of the wheel 211, the end of the axle 210 preferably is releasably keyed or otherwise removably coupled to the driven pulley 216.

An example of some suitable commercially available sealed rotary valves 222 include one or more of model numbers 375, 500, 750, and 1250 convey-through and/or drop-through sealed rotary valves made by Nu-Con Limited of Hopkins, Minn. 55343. Preferably, the housing 202 and wheel 211 are made of a food-grade material, such as stainless steel. An example of a suitable food-grade stainless steel is 316 stainless steel. Preferably, such sealed rotary valves 222 have the capability of permitting at least about 20,000 pounds of food product per hour and as much as 50,000 pounds per hour of food product to enter and/or exit the blancher 20 such that processing of the food product 22 by the blancher 20 is essentially continuous.

Figure 10:
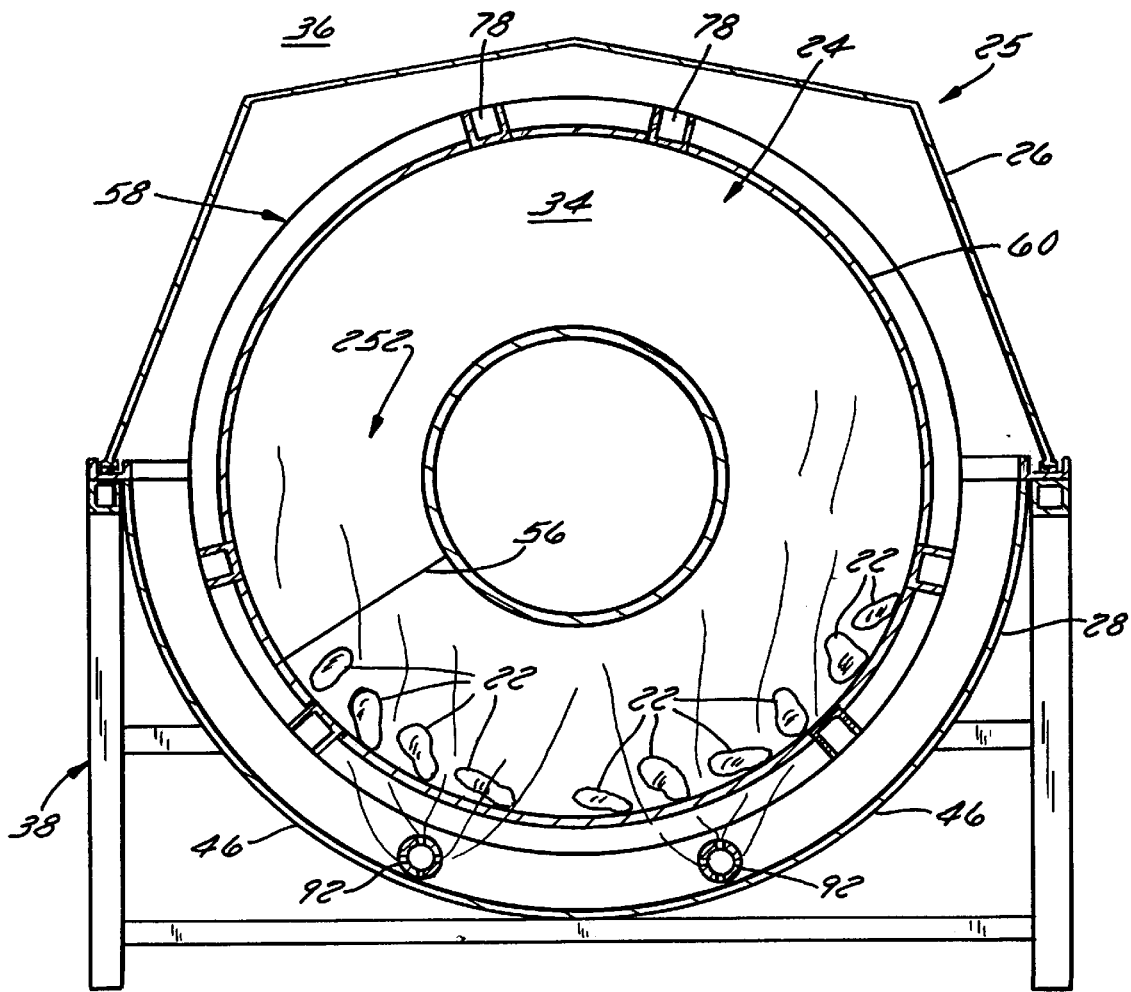
FIG. 10 is a cross sectional view of the blancher depicting operation using a gaseous/vaporous heat transfer medium.

FIG. 10 illustrates operation of the sealed blancher 20 of this invention using only a heated gas, a heated vapor, or a combination thereof, as the heat transfer medium 252 to heat food product 22 inside the blancher 20. Preferably, the gas or vapor heat transfer medium is heated to a temperature above about 200° Fahrenheit. Where the heat transfer medium 252 is a vapor, the temperature of the vapor preferably is its vaporization temperature or within about ±10 degrees of its vaporization temperature. For example, where the heat transfer medium 252 is water vapor or steam, the temperature of the steam is at least about 212° Fahrenheit and can be lower than 200° Fahrenheit. Of course, the vaporization temperature for the vaporous heat transfer medium 252 will vary depending upon factors, such as the altitude or distance above sea level and the composition of that which is being vaporized. Where the heat transfer medium comprises a heated gas, the heated gas has a temperature of at least about 210° Fahrenheit when it enters the blancher 20.

In the preferred blancher embodiment shown in FIG. 10, the gaseous or vaporous heat transfer medium is introduced into the blancher 20 such that it passes through the perforate drum sidewall 60 so as to surround and contact the food product 22 in the drum 58. In this preferred embodiment, the gaseous or vaporous heat transfer medium is introduced into the interior of the blancher 20 through the manifolds 92. Preferably, the heat transfer medium is introduced into the blancher 20 substantially throughout the length of the drum 58.

Where the blancher auger is supported by a core, the core can be of perforate construction (not shown) for introducing the heat transfer medium through a plurality of pairs of perforations in the core directly into the drum 58. Where the blancher 20 has a perforate core, no manifolds 92 are required. However, where the blancher 20 has a perforate core, the heat transfer medium can be substantially simultaneously introduced through both the core and one or more manifolds 92. Where a manifold 92 is used, a solid core can be used or the blancher auger can be of coreless construction.

To communicate gaseous or vaporous heat transfer medium to the core, a heat transfer conduit (not shown) can be made, for example, flexible stainless steel piping that extends from the exterior of the blancher 20 through either the food product inlet or the outlet to the core. Other methods and apparatuses can also be used to communicate the heat transfer medium from outside the blancher 20 to the core.

Figure 11:
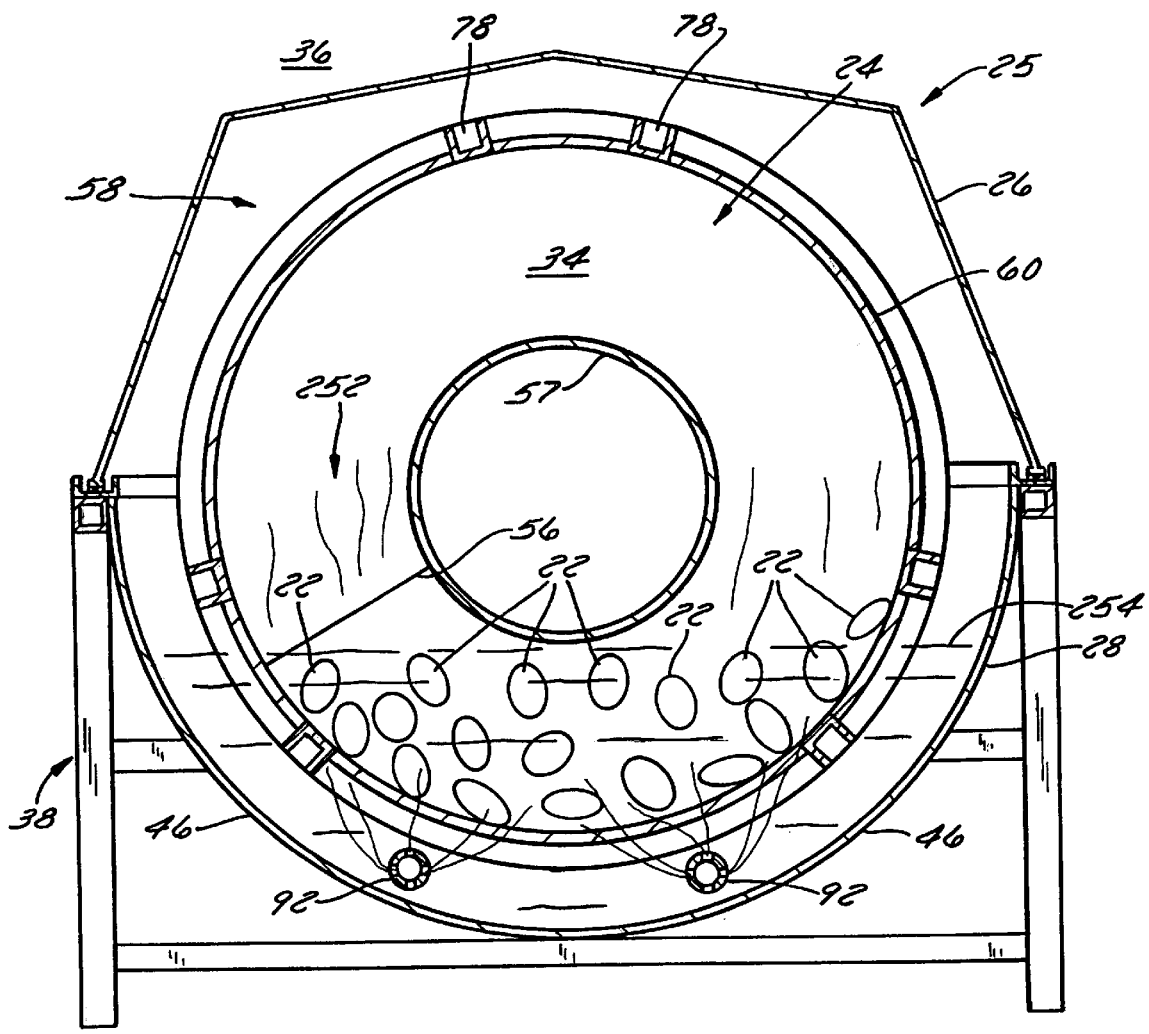
FIG. 11 is a cross sectional view of the blancher depicting blancher operation using a combination of a liquid heat transfer medium and a gaseous/vaporous heat transfer medium.

Referring to FIG. 11, the blancher 20 of this invention is also capable of operation where the heat transfer medium is a combination of a heated gas/vapor heat transfer medium 252 and a liquid heat transfer medium 254. For example, in one preferred combination, the liquid heat transfer medium comprises water 254 and the gaseous/vaporous heat transfer medium 252 comprises steam 252. Other combinations can be used.

Preferably, the liquid heat transfer medium 254 disposed in the tank 28 is heated to a temperature of at least about 120° Fahrenheit and no greater than about the vaporization temperature of the liquid heat transfer medium 254. Where the liquid heat transfer medium 254 is water, the water is heated to a temperature of at least about 160° Fahrenheit and no greater than about 212° Fahrenheit or its vaporization temperature. To enhance heat transfer, the liquid heat transfer medium 254 can flow through at least a portion of the tank 28 and/or the drum 58. If desired, the liquid heat transfer medium 254 can be introduced into the drum 58 at a flow rate that causes at least some turbulence.

Turbulence promoters can also be used to help increase the rate of heat transfer between the liquid heat transfer medium 254 and the food product 22. For example, a gas, such as air or the like, can be introduced in the tank 28 in the liquid heat transfer medium 254 to increase heat transfer. The gas can be compressed and introduced under pressure into the liquid heat transfer medium 254.

In use, the blancher 20 of this invention is used to cook or blanch food product 22 intended for human consumption by heating. Food product 22 that can be heated using a blancher 20 of this invention includes food product 22 in pouches that are preferably constructed of a flexible, synthetic material that typically is of laminate construction. Examples of pouched food product that can be processed by the blancher 20 of this invention include: sauces, soups, juices, catsup, fruits, certain pastas, vegetables, meats and the like. Examples of some vegetables that can be processed in pouches by the blancher 20 include: carrots, beans, peas, broccoli, legumes, corn, and cauliflower. Food product 22 that can be processed by the blancher 20 also includes food product 22 not in pouches. For example, pastas and vegetables, like potatoes, are but a few types of food product 22 not in pouches that can be heated, cooked or blanched by the blancher 20 of this invention. Other food products can also be processed by the blancher 20.

In operation, food product 22 is introduced into the blancher 20 through the sealed food product inlet 30 and preferably enters the drum 58. The rotary food product transport mechanism 52 rotates to urge the food product 22 from adjacent the sealed food product inlet 30 toward the sealed food product outlet 32. The rate of rotation of the rotary food product transport mechanism 52 is selected to control the residency time of the food product 22 within the blancher 20. As discussed earlier, the rotary food product transport mechanism 52 can rotate as slow as one-half of a revolution per minute to as fast as ten revolutions per minute depending on factors such as (a) the type of food product 22, (b) the length of the blancher 20, (c) the diameter of the blancher 20, (d) whether the food product 22 is being preheated, blanched or cooked, (e) the type or types of heat transfer medium being used, (f) the amount of food product 22 being heated at one time in the blancher 20, (g) the desired rate of throughput of the food product, as well as perhaps (h) other factors. Typically, the selection of a rate of rotation is based upon experience and routine testing and experimentation.

In entering the blancher 20, food product 22 is introduced into the intake chute 230 of the sealed inlet 30. As is shown in FIG. 8, at least one food product 22 is received in a movable chamber 204 between a pair of the vanes or walls 206 of the rotor 211 where it is carried by the moving rotor 211 in a clockwise direction within the housing 202 until it is discharged into the discharge chute 238 and into the blancher 20. As the vanes 206 on each side of the food product 22 rotate, the moving chamber 204 provides a substantially gas-tight seal with the housing 202 even when the food product 22 is discharged into the blancher 20. As a result of rotation of the rotor 211, a small, negligible amount of blancher atmosphere may be lost each time a movable chamber 204 communicates with the intake chute 230. As a result of this substantially gas-tight sealed inlet construction, food product 22 can enter the blancher 20 without significantly reducing the pressure of the positively pressurized blancher interior.

As the food product 22 travels within the blancher 20 along the length of the blancher 20, it is exposed to at least one type of heat transfer medium whether it be a liquid heat transfer medium, a vaporous heat transfer medium, a gaseous heat transfer medium, or a combination thereof. Contact with the heat transfer medium transfers heat to the food product 22 to a desired temperature so as to cook or blanch the food product 22.

When the food product 22 reaches the blancher outlet, one or more rotating lifting flights 90 within the blancher 20 lift the food product 22 up to the intake chute 230 of the sealed outlet 32. Referring to FIG. 8 for example, as the heated food product 22 enters the chute 230 it slides down until it is received in a movable chamber 204 of the sealed outlet 32 between a pair of the vanes 206. As the rotor 211 is rotated, the vanes 206 urge the food product 22 in a clockwise direction until it reaches the discharge chute 238. When the food product 22 reaches the discharge chute 238, gravity preferably urges the food product 22 farther downwardly until it drops onto the conveyor 86 where it is transported to another location for further processing, storage, or shipment.

Advantageously, the present invention enables a continuous or substantially continuous flow of food product 22 to be blanched or cooked by heating using a heat transfer medium that forms at least part of an atmosphere 34 within the blancher 20 that is positively pressurized to a pressure greater than the pressure of the atmosphere 36 outside the blancher 20. In its preferred embodiment, the atmosphere 34 within the blancher 20 has a pressure that is at least 15 pounds per square inch ("psi") greater than the pressure of the atmosphere 36 outside the blancher 20 and can be as much as 25 psi or greater. Preferably, the pressure of the atmosphere within the blancher 20 is at least about 15 psi absolute ("psia') and can be as high as about 25 psia or more. As a result of being positively pressurized, food product 22 will advantageously blanch or cook at least 100% faster as compared to a blancher that is not sealed and pressurized. Where steam is the heat transfer medium, it preferably is injected into the blancher 20 at a pressure of at least about 100 psia. As a result of being positively pressurized, the blancher 20 of this invention can advantageously be made at least about 50% shorter in length than a blancher that is not sealed and pressurized. For example, where it is desired to process at least about 15,000 pounds of food product per hour with a blancher that is not positively pressurized that is twenty-four feet long and six feet in diameter, a pressurized blancher 20 or 20' of this invention can be made eight feet long and four feet in diameter. It is also to be understood that, although the foregoing description and drawings describe and illustrate in detail preferred embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims.

What is claimed is:

1. A method of blanching or cooking a food product using a rotary blancher comprising:
    a) providing a substantially-sealed blancher housing defining a chamber therein and having a substantially-sealed food product inlet and a substantially-sealed food product outlet, a rotary food product transport mechanism disposed in the chamber, the food product transport mechanism comprises an auger received inside a drum that is also located inside the blancher housing, the drum having (1) an inlet opening in communication with the food product inlet for receiving the food product therein and (2) an outlet opening in communication with the food product outlet for enabling the food product to be discharged from the drum and out the blancher housing, and a heat transfer medium inlet in fluid flow communication with the chamber;
    b) introducing a heat transfer medium into the chamber;
    c) pressurizing an atmosphere within the chamber to a pressure greater than an atmosphere outside the blancher;
    d) introducing the food product through the food product inlet into the chamber;
    e) rotating the food product transport mechanism relative to said housing to urge the food product toward the food product outlet; both the auger and the drum are rotated in unison during the rotation of the food product transport mechanism; and
    f) discharging the food product from the blancher housing through the food product outlet.

2. The method of claim 1 wherein the heat transfer medium comprises a liquid and a vapor.

3. The method of claim 2 wherein the liquid comprises water having a temperature of at least about 160° Fahrenheit and the vapor comprises steam.

4. The method of claim 3 wherein during step b) steam at a pressure of at least about 100 psi is introduced into the chamber.

5. The method of claim 1 wherein the food product transport mechanism comprises a generally helical auger that is rotated at a speed of between about 0.5 rpm and about 10 rpm.

6. The method of claim 1 wherein during step c) the chamber is pressurized to a pressure of at least about 15 psi.

7. The method of claim 6 wherein during step c) the chamber is pressurized to a pressure of at least about 15 psi greater than the pressure of the atmosphere outside the blancher.

8. The method of claim 1 wherein during step c) the chamber is pressurized to a pressure of at least about 25 psi.

9. The method of claim 8 wherein during step c) the chamber is pressurized to a pressure of at least about 25 psi greater than the pressure of the atmosphere outside the blancher.

10. The method of claim 1 wherein the food product inlet comprises an inlet, an outlet in communication with the chamber, and a pair of spaced apart movable walls that define therebetween a movable chamber for receiving the food product therein and during step d) the movable walls are moved to transport the food product received in the movable chamber from the inlet toward the outlet.

11. The method of claim 10 wherein the food product inlet comprises a rotary valve driven by a motor and during step d) the motor moves the walls.

12. The method of claim 1 wherein the food product outlet comprises an inlet in communication with the chamber, an outlet, and a pair of spaced apart movable walls that define therebetween a movable chamber for receiving the food product therein and during step f) the movable walls are moved to transport the food product received in the movable chamber from the inlet toward the outlet.

13. The method of claim 10 wherein the food product outlet comprises a rotary valve driven by a motor with the movable walls comprising a rotary wheel and during step f) the motor rotates the rotary wheel.

14. The method of claim 1 wherein during step d) the food product is continuously introduced into the blancher, and during step f) the food product is continuously discharged from the blancher.

15. The method of claim 14 wherein during steps b) and c) the heat transfer medium is continuously introduced into the chamber and the heat transfer medium pressurizes the chamber.

* * * * *